Patented Dec. 15, 1925.

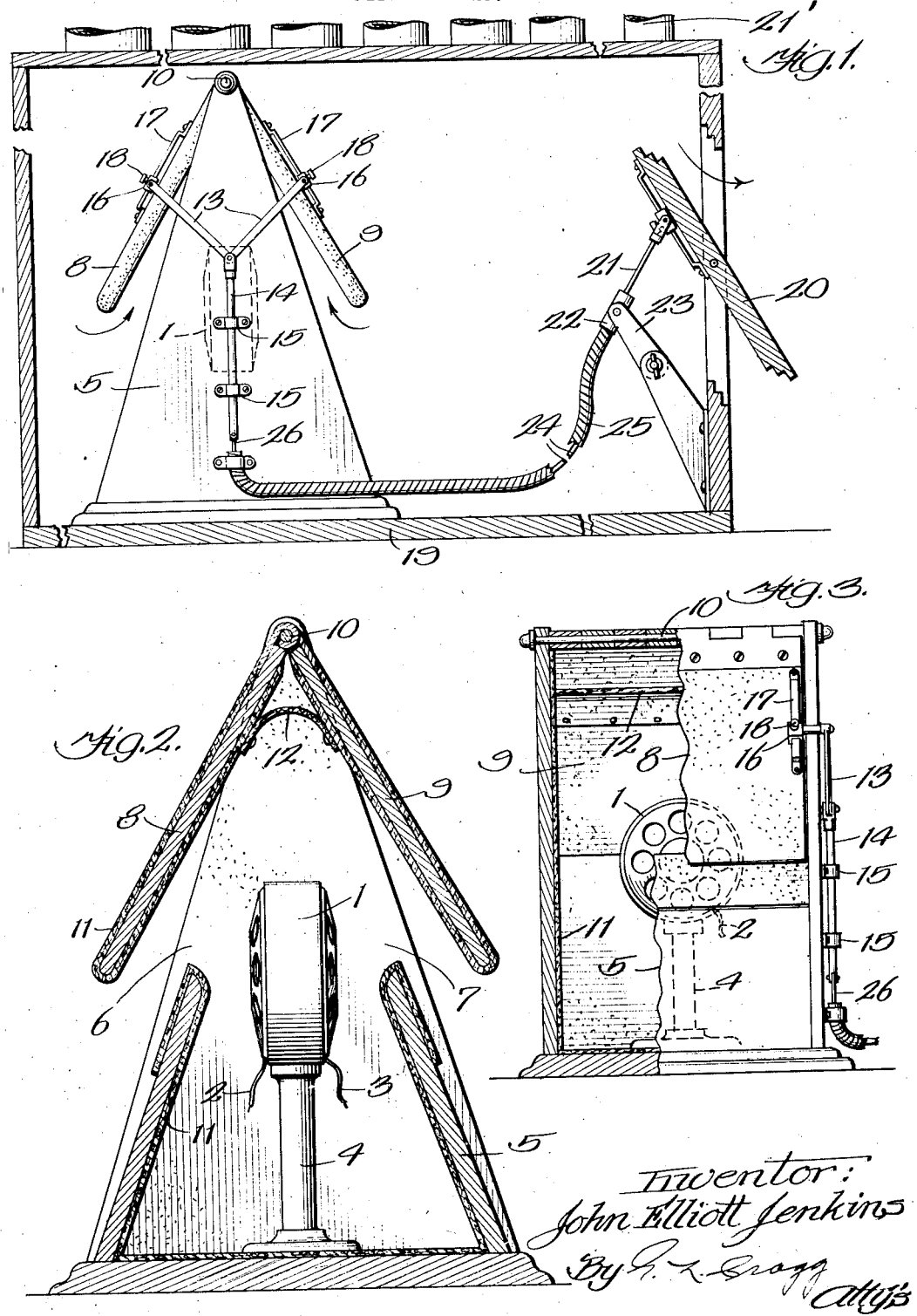

1,565,942

UNITED STATES PATENT OFFICE.

JOHN ELLIOTT JENKINS, OF CHICAGO, ILLINOIS, ASSIGNOR, BY MESNE ASSIGNMENTS, OF ONE-HALF TO ZENITH RADIO CORPORATION, A CORPORATION OF ILLINOIS.

SOUND-PROPAGATING APPARATUS.

Application filed October 29, 1924. Serial No. 746,493.

*To all whom it may concern:*

Be it known that I, JOHN ELLIOTT JENKINS, a citizen of the United States, residing at Chicago, in the county of Cook and the State of Illinois, have invented a certain new and useful Improvement in Sound-Propagating Apparatus, of which the following is a full, clear, concise, and exact description.

My invention relates to sound propagating apparatus employing a telephonic transmitter included in a telephonic circuit, the invention being of particular use in broadcasting, in which event the telephonic circuit is suitably connected with the broadcasting equipment to impress telephonic current thereon.

By means of my invention, the sound propagated by way of a transmitter may be modulated simultaneously with the modulation of the sound emanating from the sound producing instrument.

In one embodiment of the invention, the transmitter is located in the sound chamber of an organ, this chamber having a swell panel for modulating the intensity of the sound issuing from the organ as a whole, the transmitter being located within a container located within the sound chamber and having a throttler to cause a similar modulation of the sound entering the container from the sound chamber. The swell panel is coupled with the modulator supplied to said container whereby the swell panel operates the modulator supplied to said container to cause similar and simultaneous modulations of the sounds issuing from the sound chamber to the exterior of the organ and to the interior of the container.

The invention is not to be limited to any particular embodiment, as it is inclusive of a modulator for the sound emanating from any suitable sound producing means and a modulator for the sound propagated by way of a transmitter and governed by the first modulator.

The invention will be more fully explained in connection with the accompanying drawing in which Fig. 1 is a view, somewhat diagrammatic, illustrating the sound chamber of an organ with organ pipes in communication therewith and one form of equipment of my invention within said chamber; Fig. 2 is a sectional elevation of the container for the transmitter with the transmitter shown in side elevation; Fig. 3 is a front view of the transmitter container with parts thereof broken away and with mechanism for controlling a throttler with which the container is provided shown in elevation.

The telephonic transmitter 1 is of any suitable form, the transmitter illustrated being suitable for broadcasting. This transmitter is included in a suitable telephonic circuit of which terminals 2 and 3 are shown. The transmitter is supported upon a standard 4 mounted upon the bottom of a container 5. This container is preferably of wedge shape, sound passages 6 and 7 being formed in the converging sides thereof, the sound passages being provided with valves or sound throttlers 8 and 9 which are hinged at 10 upon the top of the container. The container may be formed of wood or other suitable material and is lined with felt or other sound-deadening material, as are also the throttlers, as indicated at 11, to prevent the creation of side tones or echo effects that would otherwise be due to the container. Access of sound to the hinged portions of the throttlers is also prevented by a slack webbing of felt 12. The throttlers or valves 8 and 9 are coupled by the connected links 13 that constitute a toggle connection between said valves for the purpose of effecting their simultaneous operation, these toggle links being simultaneously and equally operable by an actuating rod 14 connected with the links at their junction point and confined to rectilineal travel by means of the slide bearings 15. The valves 8 and 9 may be calibrated by adjustably connecting the upper ends of the links therewith. To this end, the upper ends of the links may be pivotally connected with sleeves 16 that are slidable upon the rods 17 carried by the valves, the intended positions of these sleeves upon said rods 17 being fixed by means of set screws 18.

The diagrammatically illustrated sound chamber 19 of the organ encloses the container. This sound chamber has a throttler or modulator 20 commonly called a swell panel which regulates the intensity of the sound passing from the organ pipes 21' through the sound chamber to the exterior of the organ, said pipes may open into this chamber for the purpose. By locating the transmitter within the sound chamber, it is removed from the influence of the other sounds upon the exterior of the organ while at the same time the sounds passing thereto from the organ are, by means of my invention, modulated similarly to the modulation effected by the swell panel 20. To this end, the modulators 8 and 9 are operated simultaneously with and by the modulator 20. The means through which the modulator 20 operates the modulators 8 and 9 similarly thereto and simultaneously therewith resides in a shaft 21 adjustably coupled with the modulator 20 similarly to the couplings between the links 13 and the modulators 8 and 9. This shaft is telescopically received within a sleeve 22 journaled upon the upper and adjustable end of the bracket 23. The shaft has a flexible continuation 24 housed within a flexible tube 25, this flexible continuation of said shaft being connected with a rigid continuation 26 which is coupled with the lower end of the rod 14.

While I have illustrated valves or throttlers 8, 9 and 20 as one means for modulating the sounds emanating from the sound producer, I do not wish to be limited to any particular form of modulators which may be employed.

The container acts as a receiver of sounds from the sound chamber and while the transmitter is preferably disposed within such receiver in order that it may be subject to the sounds received therein, the invention is not to be thus limited.

Changes may be made without departing from my invention.

Having thus described my invention, I claim:—

1. A telephonic transmitter included in a telephonic circuit in combination with a container enclosing it formed with converging sides each having a sound passage and valves for said passages coupled to have simultaneous opening and simultaneous closing movements.

2. A telephonic transmitter in combination with a container enclosing it having a plurality of sound passages and valves for said passages coupled to have simultaneous opening and simultaneous closing movements.

3. In a sound propagating system, the combination with a telephonic transmitter included in a telephonic circuit; of sound producing means to the sound from which the transmitter is subject; a modulator for the sound emanating from said means; and a modulator for the sound passing to the transmitter and governed by the first modulator.

4. In a sound propagating system, the combination with a telephonic transmitter included in a telephonic circuit; of sound producing means to the sound from which the transmitter is subject; an adjustable throttler for the sound emanating from said means; and an adjustable throttler for the sound passing to the transmitter and governed by the first throttler.

5. In a sound propagating system, the combination with a telephonic transmitter included in a telephonic circuit; of sound producing means to the sound from which the transmitter is subject; a modulator for the sound emanating from said means; and a modulator for the sound propagated by way of the transmitter and governed by the first modulator.

6. In a sound propagating system, the combination with a sound producing means; of a sound chamber receiving sound from said means and imparting it to the exterior of the chamber; a modulator for the sound passing from the chamber to its exterior; a telephonic transmitter in a telephonic circuit; a container enclosing the transmitter and enclosed by said chamber from which the container receives sounds; and a modulator for the sound passing to the container and governed by the first modulator.

7. In a sound propagating system, the combination with a sound producing means; of a sound chamber receiving sound from said means and imparting it to the exterior of the chamber; a throttler for the sound passing from the chamber to its exterior; a telephonic transmitter in a telephonic circuit; a container enclosing the transmitter and enclosed by said chamber from which the container receives sounds; and a throttler for the sound passing to the container and governed by the first throttler.

8. In a sound propagating system, the combination with a sound producing means; of a sound chamber receiving sound from said means and imparting it to the exterior of the chamber; a modulator for the sound passing from the chamber to its exterior; a telephonic transmitter in a telephonic circuit; a sound receiver for conveying sound to the transmitter and enclosed by said chamber from which said receiver receives sounds; and a modulator for the sound passing to the receiver and governed by the first modulator.

9. In a sound propagating system, the combination with a sound producing means; of a sound chamber receiving sound from said means and imparting it to the exterior of the chamber; a throttler for the sound passing from the chamber to its exterior; a telephonic transmitter in a telephonic circuit; a sound receiver for conveying sound to the transmitter and enclosed by said chamber from which said receiver receives sounds; and a throttler for the sound passing to the receiver and governed by the first throttler.

10. In a sound propagating system, the combination with a sound producing means; of a sound chamber receiving sound from said means and imparting it to the exterior of the chamber; a modulator for the sound passing from the chamber to its exterior; a telephonic transmitter in a telephonic circuit; a sound receiver for conveying sound to the transmitter and receiving sounds from said chamber; and a modulator for the sound passing to the receiver and governed by the first modulator.

11. In a sound propagating system, the combination with a sound producing means; of a sound chamber receiving sound from said means and imparting it to the exterior of the chamber; a throttler for the sound passing from the chamber to its exterior; a telephonic transmitter in a telephonic circuit; a sound receiver for conveying sound to the transmitter and receiving sounds from said chamber; and a throttler for the sound passing to the receiver and governed by the first throttler.

In witness whereof, I hereunto subscribe my name.

JOHN ELLIOTT JENKINS.